United States Patent Office 3,823,141
Patented July 9, 1974

3,823,141
7 - (o-AMINOMETHYL-p-HYDROXY-PHENYLACET-
AMIDO) - 3-(3-HYDROXY-PYRIDAZIN-6-YLTHIO-
METHYL)-3-CEPHEM-4-CARBOXYLIC ACID
Takayuki Naito, Tokyo, and Jun Okumura, Yokohama, Japan, assignors to Bristol-Myers Company, New York, N.Y.
No Drawing. Filed Sept. 6, 1972, Ser. No. 286,792
Int. Cl. C07d 99/24
U.S. Cl. 260—243 C        7 Claims

ABSTRACT OF THE DISCLOSURE

7 - (o - Aminomethyl - p - hydroxyphenylacetamido)-3-(3 - hydroxy - pyridazin - 6 - ylthiomethyl) - 3 - cephem-4-carboxylic acid and its nontoxic, pharmaceutically acceptable salts and especially its dimethanesulfonate derivative are valuable as antibacteria agents, as nutritional supplements in animal feeds and as therapeutic agents in poultry and animals, including man, and are especially useful in the tretment of infectious diseases caused by many Gram-positive and Gram-negative bacteria. 7-(o-Aminomethylphenyl - p - hydroxyacetamido) - 3 - (3-hydroxypyridazin - 6 - ylthiomethyl) - 3 - cephem - 4-carboxylic acid is prepared, for example, by treatment at 0° C. with trifluoroacetic acid of the corresponding compound in which the free amino group is protected with a tert.-butoxycarbonyl group.

BACKGROUND OF THE INVENTION (1) Field of the invention.—The cephalosporins of the present invention possess the usual attributes of such compounds and are particularly useful in the treatment of bacterial infections.

(2) Description of the prior art.—Cephalothin and cephaloridine are well-known antibacterial agents; see U.S. patents 3,218,318; 3,449,338 and 3,498,979. The patent literature also contains considerable data on cephaloglycin and cephalexin; see U.S. Pats. 3,303,193; 3,422,103; 3,364,212 and 3,507,861 and Great Britain 985,747; 1,054,806 and 1,174,335 and Belgium 696,026 (Farmdoc 29,494) and South Africa 67/1260 (Farmdoc 28,654). Newer cephalosporins include cefazolin and cephapirin; see U.S. Pat. 3,516,997 [and also Netherlands 68/5,179 (Farmdoc 34,328) and South Africa 68/4,513] and U.S. Pat. 3,422,100.

The literature on cephalosporins has been reviewed, for example, by E. P. Abraham, Pharmacol. Rev. 14, 473–500 (1962), by I. M. Rollo, Ann. Rev. Pharmacol, 6, 218–221 (1966), by E. P. Abraham, Quart. Rev. (London) 21, 231 (1967), by E. Van Heyningen, Advan. Drug Res., 4, 1–70 (1967), by G. T. Stewart, The Penicillin Group of Drugs, Elsevier Publishing Company, New York, New York (1965) at pages 185–192 and briefly in Annual Reports in Medicinal Chemistry, Academic Press, Inc., 111 Fifth Avenue, New York, N.Y., 10003, by L. C. Cheney on pages 96–97 (1967), by K. Gerzon and R. B. Morin on pages 90–93 (1968), by K. Gerzon on pages 78–80 (1969) and by L. H. Conover on pages 101–102 (1970). New cephalosporins are frequently reported at the annual Interscience Conference on Antimicrobial Agents and Chemotherapy as illustrated by Sassiver et al., Antimicrobial Agents and Chemotherapy—1968, American Society for Microbiology, Bethesda, Md., pages 101–114 (1969) and by Nishida et al., ibid, 236–243 (1970). Two excellent recent reviews are The Cephalosporins Microbiological, Chemical and Pharmacological Properties and Use in Chemotherapy of Infection, L. Weinstein and K. Kaplan, Annals of Internal Medicine, 72, 729–739 (1970) and Structure Activity Relationships Among Semisynthetic Cephalosporins, M. L. Sassiver and A. Lewis, Advances in Applied Microbiology, edited by D. Perlman, 13, 163–236 (1970), Academic Press, New York.

7-Phenylacetamidocephalosporanic acid has also been named N-phenylacetyl derivative of 7-ACA, cephaloram, PACA and apparently phenasporin. Publications in the scientific literature on the prepartion and/or properties of this compound, with or without substituents in the benzene ring, and corresponding compounds in which the 3-acetoxymethyl group has been replaced by methyl, hydroxymethyl and/or pyridiniummethyl include the following:

Chauvette, R. R., et al. "Chemistry of Cephalosporin Antibiotics II. Preparation of a New Class of Antibiotics and the Relation of Structure to Activity," Journal of the American Chemical Society, 84, 3401–3402 (1962).

Chauvette, R. R., et al. "Structure-Activity of Relationships Among 7 - Acylamidocephalosporanic Acids," Antimicrobial Agents and Chemotherapy—1962, 687–694.

Cocker, J. D., et al., "Cephalosporanic Acids. Part II. Displacement of the Acetoxy-group by Nucleophiles," Journal of the Chemical Society, 5015–5031 (1965).

Cocker, J. D., et al., "Cephalosporanic Acids. Part IV. 7-Acylamidoceph-2-em-4-carboxylic Acids," Journal of the Chemical Society, 1142–1151 (1966).

Culp, H. W., et al., "Metabolism and Absorption of the 7-(Phenylacetamido-1-C$^{14}$)-Cephalosporanic Acid," Antimicrobial Agents and Chemotherapy—1963, 243–246.

Jago, M., "Antibacterial Activity of Some Derivatives of 7-Aminocephalosporanic Acid Against Staphylococcus Aureus and Synergism Between These and Other Antibiotics," Brit. J. Pharmacol., 22, 22–23 (1964).

Loder, B., et al., "The Cephalosporin C Nucleus (7-Aminocephalosporanic Acid) and Some of Its Derivatives," Biochemical Journal, 79, 408–416 (1961).

Nishida, M., et al., "Studies on Microbial Degradation of Cephalosporin C Derivatives. II," The Journal of Antibiotics, 21, 375–378 (1968).

Nishida, M., et al., "Studies of Microbial Degradation of Cephalosporin C Derivatives. II," The Journal of Antibiotics, 21, 165–169 (1968).

Spencer, J. L., et al., "Chemistry of Cephalosporin Antibiotics VIII. Synthesis and Structure-Activity Relationships of Cephaloridine Analogues," Antimicrobial Agents and Chemotherapy—1966, 573–580.

Stedman, R. J., et al., "7-Aminodesacetoxycephalosporanic Acid and Its Derivatives," J. Med. Chem., 7(1), 117–119 (1964).

Sullivan, H. R., et al., "Metabolism of Oral Cephalothin and Related Cephalosporins in the Rat," Biochemical Journal, 102, 976–982 (1967).

Vymola, F., et al., "The Classification and Characteristics of Cephalosporin Antibiotics I. Systematic Study of the Quantitative Sensitivity of Some Pathogenic Microorganisms to Cephaloridine," Journal of Hygiene, Epidemiology, Microbiology and Immunology, 10, 180–189 (1966).

Many other 7-acyl derivatives of 7-aminocephalosporanic acid have been reported in the patent literature including 7-[4-(α - aminoalkyl)phenylacetamido]cephalosporanic acids (U.S. 3,382,241), 7-[(p-aminophenylthio) acetamido]-cephalosporanic acid (U.S. 3,422,100) 7-[(o-aminomethylphenylthio)acetamido]cephalosporanic acid (U.S. 3,657,232), 7-(halophenylthioacetamido)cephalosporanic acids (U.S. 3,335,136) and the nearly unlimited number of variations of such compounds encompassed by the generic formulae (and often not otherwise described) of such patents as Netherlands 69/2013 (Farmdoc 39,172). 7-(p - Aminophenylacetamido)-cephalosporanic acid is disclosed in U.S. Pat. 3,422,103 as is the corresponding N-trityl derivative; see also Japan 2,712/67 (Farmdoc 25,406).

U.S. Pat. 3,219,662 includes claims to compounds of the structure R—CH₂—CO—ACA in which R is phenyl, nitrophenyl (especially para-nitro), chlorophenyl, alkylphenyl and alkoxyphenyl and the corresponding phenoxy and substituted compounds and for all of those the corresponding compounds in which the 3-acetoxymethyl group has been replaced by a 3-pyridiniummethyl group. A more extensive group of such compounds, including the series in which R is phenylthio and also the compounds in which R is benzyl [i.e., 7-(β-phenylpropionamido)cephalosporanic acid], alkoxybenzyl, alkanoyloxybenzyl, aminobenzyl, etc. are disclosed, at least generically, for use as starting materials in U.K. 1,012,943 (corresponding to U.S. 3,278,531 which is discussed further below) and 1,153,421 (Farmdoc 23,984) and see also U.K. 1,001,478 and U.S. 3,280,118, 3,258,461 and 3,338,896. Additional 7-phenylacetamidocephalosporanic acids having substituents on the benzene ring including hydroxy and amino are disclosed as starting materials in U.K. 1,082,943 and 1,082,962.

U.S. Pat. 3,341,531 describes the 7-(o-, m- and p-carboxamidomethylphenylacetamido)cephalosporanic acids and their betaines. A variety of 7-(halo-, dihalo- nitro- and halonitro-phenylacetamido)cephalosporanic acids are named as starting materials for reaction with certain nucleophiles in U.S. Pat. 3,431,259 (Farmdoc 27,715). Additional 7-phenylacetamido)cephalosporanic acids having various substituents on the benzene ring are disclosed in Japan 2,712/67 (Farmdoc 25,406), Japan 26,105/69 (Farmdoc 40,860), Great Britain 1,178,471 (Farmdoc 27,715, see Netherlands 67/906) and Japan 25,785/69 (Farmdoc 40,847).

Replacement of the 3-acetoxy group of a cephalosporin by various heterocyclic thiols has been disclosed (a) in South Africa 70/2,290 [see also Netherlands 70/5,519 (Farmdoc 80,188R)] where the sidechains were, for example, 7-α-aminophenylacetamido and typical heterocyclic thiols were 2-methyl-1,3,4-thiadiazole-5-thiol and 1-methyl-1,2,3,4-tetrazole-5-thiol, and (b) in U.S. 3,516,997 where the sidechains at the 7-position had structures such as R³—(alk)ₘ—CO—NH— and R³—S—(alk)ₘ—CO—NH— in which R³ was one of many aromatic heterocycles and the numerous heterocyclic thiols at the 3-position included, for example, 1-methyl tetrazole-5-thiol and 2-methyl-1,3,4-thiadiazole-5-thiol, and (c) in U.S. Pat. 3,563,983.

U.S. Pat. 3,492,297 includes 7-(p-guanidinophenylacetamido)cephalosporanic acid and its betaine.

In cephaloridine the 3-acetoxy group of cephalothin was replaced by a pyridinium group as described, for example, in U.S. Pats. 3,449,338 and 3,498,979.

The preparation of various 7-[α-amino-arylacetamido]-cephalosporanic acids and the corresponding desacetoxy compounds in which aryl represents unsubstituted or substituted phenyl or 2- or 3-thienyl is described, for example, in British specifications 985,747; 1,017,624; 1,054,806 and 1,123,333, in Belgian Pat. 696,026 (Farmdoc No. 29,494), in U.S. Pats. 3,311,621; 3,352,858; 3,489,750; 3,489,751; 3,489,752 and 3,518,260, in Japanese Pat. 1,6871/66 (Farmdoc 23,231), by Spencer et al., *J. Med. Chem.*, 9 (5), 746–750 (1966) and by Kurita et al., *J. Antibiotics* (Tokyo) (A) 19, 243–249 (1966) and see also U.S. Pat. 3,485,819.

Netherlands Pats. 68/1,1676 (Farmdoc 36, 349) and 68/1,2382 (Farmdoc 36,496) and U.S. Pats. 3,489,750 and 3,489,751 and 3,489,752 disclose ring-substituted cephaloglycins.

Various 7-[α-amino-arylacetamido]cephalosporins in which one hydrogen of the α-amino group is replaced by a carbonyl group which is attached in turn to another moiety have been reported. The earliest were the cephaloglycin and cephaleexin precursors in which use was made of a common peptide blocking group such as carbobenzyloxy as illustrated by U.S. Pat. 3,364,212, Belgian Pat. 675,298 (Farmdoc 22,206), South African patent 67/1260 (Farmdoc 28,654) and Belgian patent 696,026 (Farmdoc 29,494). Related compounds include those of U.S. patents 3,303,193 and 3,311,621 and 3,518,260.

Various cephalosporins, including cephalosporin C on occasion, have been reacted with nucleophilic, aromatic mercaptans to produce compounds having the structure

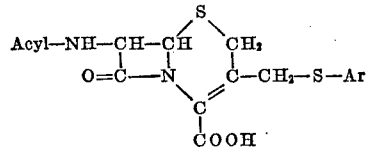

In U.S. Pat. 3,278,531 Ar is phenyl or certain substituted phenyls or certain aromatic heterocyclic rings named, for example, in column 5; in that patent (which corresponds to U.K. 1,012,943) "acyl" in the formula above is defined, among many other meanings, as including phenylacetyl, β-phenylpropionyl and phenylthioacetyl with or without various named substituents for the benzene ring. Similar nucleophiles, e.g. 2-mercaptopyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition "h" for R₃. Additional nucleophiles of this type were disclosed by Fujisawa in Belgium 714,518 (Farmdoc 35,307; Netherlands 68/6,129 and South Africa 2,695/68), in Canada 818,501 (Farmdoc 38,845), in Great Britain 1,187,323 (Farmdoc 31,936; Netherlands 67/14888) and especially in U.S. 3,516,997 (Farmdoc 34,328; Netherlands 68/5,179) which includes the compound named cefazolin, which has a tetrazolylacetyl sidechain on the 7-amino group and a 5-methyl-thiadiazolyl-thiomethyl group at the 3-position and is described at some length in the scientific literature, e.g. in Antimicrobial Agents and Chemotherapy, 1969, American Society for Microbiology, Bethesda, Md., at pages 236–243 and in J. Antibiotics (Japan) 23 (3), 131–148 (1970).

More recently, replacement of the 3-acetoxy group of a cephalosporin by various heterocyclic thiols has been disclosed in U.S. 3,563,983 and in Netherlands 70/5,519 (Farmdoc 80,188R) where the sidechains were, for example, 7-α-aminophenylacetamido and typical heterocyclic thiols were 2-methyl-1,3,4-thiadiazole-5-thiol and 1-methyl-1,2,3,4-tetrazole-5-thiol; the latter corresponds to U.S. Pat. 3,641,021 issued Feb. 8, 1972 on an application filed Apr. 18, 1969. Additional similar disclosures are found in U.S. Pat. 3,563,983, Belgium 771,189 (Farmdoc 12, 817T), Japan 72/5,550 (Farmdoc 12,921T) and Japan 72/551 (Farmdoc 12,922T).

Various cephalosporins having the structure

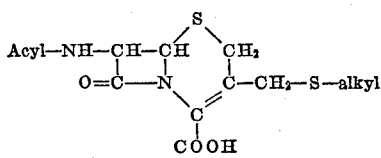

in which acyl represents various sidechains including α-aminophenylacetyl have been described in some of the above and by Glaxo in Belgium 734,532 (Farmdoc 41,619) and in Belgium 734,533 (Farmdoc 41,620) and in U.S. 3,668,203.

Cephalosporins having the structure

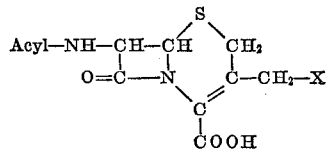

where X includes

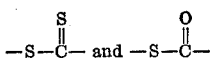

are disclosed in some of the above and in U.S. 3,239,515; 3,239,516; 3,243,435; 3,258,461; 3,431,259 and 3,446,803.

Related publications in the scientific literature include J. Med. Chem. 8, 174–181 (1965) and J. Chem. Soc. (London) 1595–1605 (1965), 5015–5031 (1965) and 1959–1963 (1967).

SUMMARY OF THE INVENTION

This invention comprises the amphoteric compound of the formula

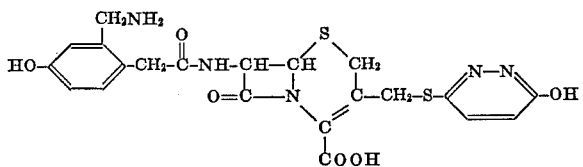

which exists primarily as the zwitterion, its dimethanesulfonate derivative and their nontoxic, pharmaceutically acceptable salts and easily hydrolyzed esters.

Such salts include the nontoxic carboxylic acid salts thereof, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N' - bis-dehydroabietylethylenediamine, N-(lower)-alkylpiperidine, e.g. N-ethylpiperidine, and other amines which have been used to form salts with benzylpenicillin; and the nontoxic, acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

Also included in this invention are the compounds (used as either intermediates or metabolic precursors) in which the amino group is "blocked" by substituents such as t-butoxycarbonyl, carbobenzyloxy, formyl, o-nitrophenylsulfenyl, β,β,β-trichloroethoxycarbonyl, 4-oxo-2-pentenyl-2, 1-carbomethoxy-1-propenyl-2- and the like. Particularly included in such blocking groups are the ketones (especially acetone) and aldehydes (especially formaldehyde and acetaldehyde) disclosed, for example, in U.S. Pats. 3,198,804 and 3,347,851 and the β-keto-esters and β-diketones disclosed, for example, in U.S. Pat. 3,325,479 and the β-ketoamides disclosed in Japan 71/24,714 (Farmdoc 47,321S).

There is also provided, according to the present invention, the process for the preparation of the compound having the formula

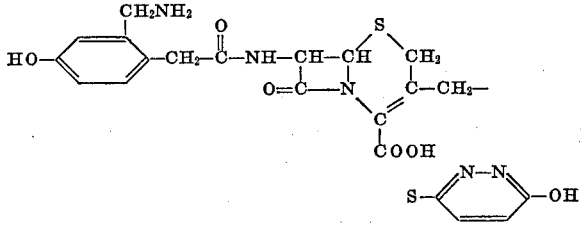

and the nontoxic salts and easily hydrolyzed esters thereof which comprises reacting the compound of the formula

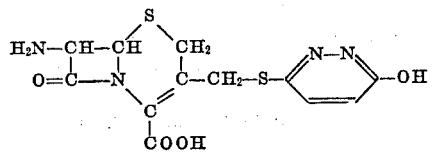

II or a salt or easily hydrolyzed ester thereof with an acylating derivative of the acid (in which the amino group is protected) having the formula

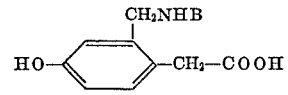

wherein B represents the amino-protecting group (that is, with that acid or its reactive derivative substituted at the carboxyl group) to produce the compound (in which the amino group is protected) having the formula

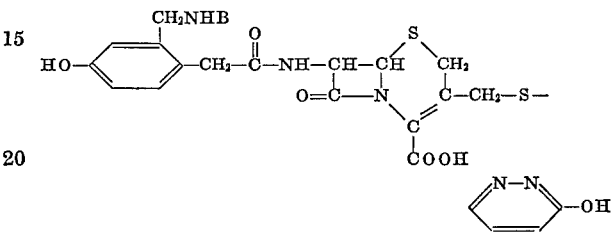

or the corresponding salt or easily hydrolyzed ester thereof wherein B represents the amino-protecting group, and subsequently subjecting the resulting compound to chemical removal of the amino-protecting group, that is, subjecting the resulting compound to elimination reaction of the protecting group.

The amphoteric compound of the present invention is prepared according to the present invention by coupling with a particular 3-thiolated-7-aminocephalosporanic acid designated II, that is, 7-amino-3-(3-hydroxy-pyridazin-6-ylthio methyl)-3-cephem-4-carboxylic acid or a salt or easily hydrolyzed ester thereof (including, but not limited to, those of U.S. Pat. 3,284,451 and U.K. 1,229,453 and any of the silyl esters described in U.S. Pat. 3,249,622 for use with 7-amino-penicillanic acid and used in Great Britain 1,073,530 and particularly the pivaloyloxymethyl, acetoxymethyl, methoxymethyl, acetonyl, phenacyl, p-nitrobenzyl and β,β,β-trichloroethyl esters) a particular acid or its functional equivalent as an acylating agent for a primary amino group. After coupling, the blocking group is removed to give the desired product. Said acid has the formula

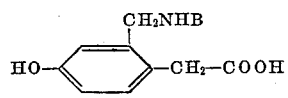

wherein B represents a blocking group of the type used either in peptide syntheses or in any of the numerous syntheses of ampicillin or cephaloglycin or cephalexin from 2-phenylglycine. Particularly valuable blocking groups are a proton, as in the compound of the formula

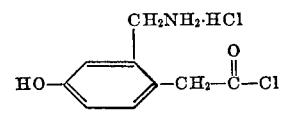

or a β-diketone or β-ketoester as in Great Britain 1,123,333 and U.S. 3,325,479 and U.S. 3,316,247, e.g., methyl acetoacetate, or a β-ketoamide as in Japan 71/24,714 (Farmdoc 47,321S) in which case the acid containing the blocked amino group is preferably converted to a mixed anhydride, as with ethyl chloroformate, before reaction with compound II or a salt thereof to form the desired product I after acid cleavage.

Further to the discussion above of blocking groups used on the free amino group of the sidechain acid during its coupling with compound II, the blocking group is then removed to form the products of the present invention, e.g., the t-butoxy-carbonyl group is removed by treatment with formic acid, the carbobenzyloxy group is removed by catalytic hydrogenation, the 2-hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with compound II, functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g., with p-nitrophenyl, 2,4-dinitrophenol, thiophenol, thioacetic acid) may be used or the free acid itself may be coupled with compound II after first reacting said free acid with N,N'-dimethylchloroformiminium chloride [cf. Great Britain 1,008,170 and Novak and Weichet, *Experientia XXI*, 6, 360 (1965)] or by the use of enzymes or of an N,N'-carbonyldiimidazole or an N,N'-carbonylditriazole [cf. South African patent specification 63/2684] or a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, *J. Amer. Chem. Soc.*, 77, 1067 (1955)], or of alkylylamine reagent [cf. R. Buijle and H. G. Viehe, *Angew. Chem. International* Edition 3, 582, 1964)] or of an isoxasolium salt reagent [cf. R. B. Woodward, R. A. Olofson and H. Mayer, *J. Amer. Chem. Soc.*, 83, 1010 (1961)], or of a ketenimine reagent [cf. C. L. Stevens and M. E. Mond, *J. Amer. Chem. Soc.*, 80, (4065)].

Another equivalent of the acid chloride is a corresponding azolide, i.e., an amide of the corresponding acid whose amide nitrogen is a member of an quasiaromatic five membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolide. The by-product, imidazole, precipitates and may be separated and the imidazolide isolated, but this is not essential. The methods for carrying out these reactions to produce a cephalosporin and the methods used to isolate the cephalosporin so produced are well known in the art.

Mention was made above of the use of enzymes to couple the free acid with its blocked amino group with compound II. Included in the scope of such processes are the use of an ester, e.g. the methyl ester, of that free acid with enzymes provided by various microorganisms, e.g. those described by T. Takahashi et al., *J. Amer. Chem. Soc.*, 94 (11), 4035–4037 (1972) and by T. Nara et al., *J. Antibiotics* (Japan) 24 (5), 321–323 (1971) and in U.S. 3,682,777.

In the treatment of bacterial infections in man, the compounds of this invention are administered parenterally, in accordance with conventional procedures for antibiotic administration, in an amount of from about 5 to 200 mg./kg./day and preferably about 5 to 20 mg./kg./day in divided dosage, e.g. three to four times a day. They are administered in dosage units containing, for example, 125, 250 or 500 mg. of active ingredient with suitable physiologically acceptable carriers or excepients. The dosage units are in the form of liquid preparations such as solutions or suspensions.

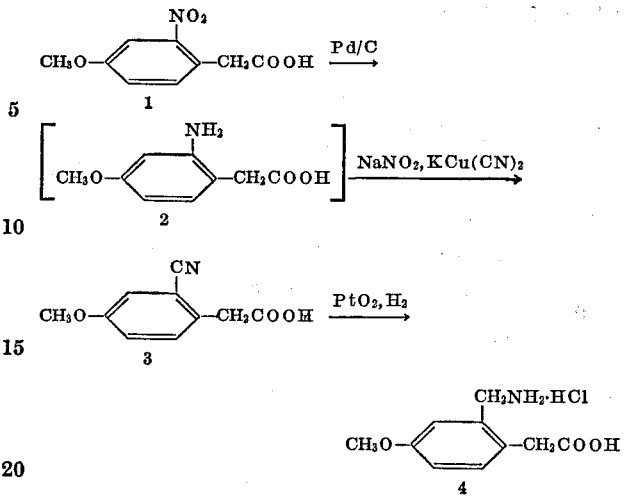

STARTING MATERIALS

2-Cyano-4-methoxyphenylacetic acid

A solution of 12.7 g. (0.06 mole) of 4-methoxy-2-nitrophenylacetic acid (D. G. Harvey et al., *J. Chem. Soc.*, 1938, 97) and 2.4 g. (0.06 mole) of sodium hydroxide in 100 ml. of water was hydrogenated at room temperature under a hydrogen pressure of 50 p.s.i. with 1 g. of 10% palladium-on-charcoal as a catalyst. The theoretical amount of hydrogen was absorbed in one hour. The catalyst was removed by filtration using a filter precoated with diatomaceous earth ("Celite"). To the filtrate was added dropwise a solution of 4.2 g. (0.06 mole) of sodium nitrite in 30 ml. of water at 0° C., then 20 ml. of conc. hydrochloric acid (ca. 0.25 mole) was added dropwise with stirring at the same temperature. Stirring was continued for 10 minutes. A solution of 4.1 g. (0.03 mole) of potassium carbonate in 10 ml. of water was added. The reaction mixture was added to a solution of 10 g. of potassium cyanide and 7 g. of cuprous cyanide in 33 ml. of water with vigorous stirring at 0° C. and the mixture was stirred for 10 minutes at 0° C., for one hour at 10–15° C., finally for 2 hours at 50° C., diluted with 300 ml. of water and filtered. The filtrate was acidified with conc. hydrochloric acid, extracted with ethyl acetate (5× 100 ml.) and back-extracted with 5% sodium bicarbonate solution (5× 100 ml.). The combined aqueous extracts were decolorized with a small amount of active carbon, chilled, acidified with conc. hydrochloric acid and extracted with ethyl acetate (3× 100 ml.). The extracts were washed with water (3× 30 ml.), saturated sodium chloride solution (3× 30 ml.) and dried with anhydrous sodium sulfate. Removal of the solvent gave 8.7 g. (76%) of 2-cyano-4-methoxyphenylacetic acid which was recrystallized from benzene-ligroin. M.P. 130–132° C.

IR: $\gamma_{CN}^{KBr}$ 2240 cm.$^{-1}$

NMR: $\delta_{p.p.m.}^{DMSO-d_6}$ 3.69 (2 H, s, $CH_2$—CO), 3.77 (3 H, s, $OCH_3$), 6.9–7.4 (3 H, m, phenyl-H).

Anal. Calcd. for $C_{10}H_9NO_3$: C, 62.82; H, 4.75; N, 7.33. Found: C, 62.92; H, 4.74; N, 7.20.

2-Aminomethyl-4-methoxyphenylacetic acid hydrochloride

A solution of 8.2 g. (0.043 mole) of 2-cyano-4-methoxyphenylacetic acid in 100 ml. of ethanol and 50 ml. of 6 N hydrochloric acid was hydrogenated with platinum oxide for 2 days at room temperature under 50 p.s.i. hydrogen pressure. The catalyst was removed by filtration. The filtrate was evaporated to dryness. The residue was washed with acetone (3× 20 ml.) to give 5.5 g. of 2-aminomethyl-4-methoxyphenylacetic acid hydrochloride.

NMR: $\delta_{p.p.m.}^{DMSO-d_6}$ 3.61 (2 H, s, $CH_2$—CO), 3.70 (3 H, s, $OCH_3$), 3.9 (2 H, q, 6.0 Hz, $CH_2$—N), 6.5–7.3 (3 H, m, phenyl-H), 8.5 (3H, br, $NH_3^+$).

2-Aminomethyl-4-hydroxyphenylacetic acid

A mixture of 3 g. (0.013 mole) of 2-aminomethyl-4-methoxyphenylacetic acid hydrochloride and 40 ml. of 48% hydrobromic acid was refluxed for 5 hours. The reaction mixture was treated with active carbon and neutralized (pH 6–7) with 6 N sodium hydroxide to give a precipitate of 2-aminomethyl-4-hydroxyphenylacetic acid which was collected by filtration, washed with water and acetone, and dried in vacuo. Yield 1.9 g. (81.5%). M.p. >300° C.

2-t-Butoxycarbonylaminomethyl-4-hydroxyphenylacetic acid

To a solution of 2.1 g. (0.012 mole) of 2-aminomethyl-4-hydroxyphenylacetic acid and 1.4 g. (0.035 mole) of sodium hydroxide in 50 ml. of water was added a solution of 2.0 g. (0.014 mole) of t-butoxycarbonylazide in 25 ml. of THF and the mixture was stirred for 22 hours at room temperature, washed with ether acidified with dil. hydrochloric acid, extracted with ether (2× 150 ml.). The combined extracts were washed with water (2× 50 ml.) and a saturated sodium chloride solution (3× 50 ml.) and dried. The solvent was removed and the oily residue was triturated with chloroform-carbon tetrachloride (1:1, 50 ml.) to give 1.7 g. (52%) of 2-t-butoxycarbonylaminomethyl - 4 - hydroxyphenylacetic acid as white solid melting at 145–147° C.

IR: $\nu_{max.}^{KBr}$ 3340, 1700, 1680, 1260 cm.$^{-1}$.

NMR: $\delta_{p.p.m.}^{DMSO-d_6}$ 1.37 (9 H, s, t-Bu-H), 3.42 (2 H, s, $CH_2CO$), 3.97 (2 H, d, 6 Hz, $CH_2$—N), 6.3–7.1 (3 H, m, phenyl-H), 9.00 (1 H, br, NH), 12.0 (1 H, br, NH).

Anal. Calcd. for $C_{14}H_{19}NO_5$: C, 59.77; H, 6.81; N, 4.98. Found: C, 58.84; H, 6.89; N, 4.79.

7 - (2 - t - Butoxycarbonylaminomethyl-4-hydroxyphenyl-acetamido) - 3 - (6-hydroxypyridazin-3-ylthiomethyl)-3-cephem-4-carboxylic acid To a solution of 1.7 g. (6 mmoles) of 2-t-butoxycarbonylaminomethyl-4-hydroxyphenylacetic acid and 1.2 g. (6.6 mmoles) of 2,4-dinitrophenol in 40 ml. of THF was added in one portion 1.35 g. (6.6 mmoles) of dicyclohexylcarbodiimide and the mixture was stirred for 1.5 hours at room temperature. The separated urea was removed by filtration. To the filtrate was added in one portion a solution of 2.0 g. (5.9 mmoles) of 7-amino-3-(6 - hydroxypyridazin - 3 - ylthiomethyl)-3-cephem-4-carboxylic acid and 1.7 ml. (ca. 12 mmoles) of triethylamine in 30 ml. of water. The mixture was stirred for 20 hours at room temperature, washed with ethyl acetate (3× 150 ml.) and acidified with 6 N hydrochloric acid to give a precipitate which was collected by filtration, washed with water (50 ml.) and dried. The precipitate was dissolved in one L of methanol at 50° C. and filtered to remove a small amount of insoluble matter. The filtrate was treated with active carbon and evaporated to dryness. The residue was triturated with ether (50 ml.) to give 920 mg. (25%) of 7-(2-t-butoxycarbonylaminomethyl - 4 - hydroxyphenylacetamido) - 3 - (6-hydroxypyridazin - 3 - ylthiomethyl)-3-cephem-4-carboxylic acid melting at 190–200° C. (dec.).

IR: $\nu_{max.}^{KBr}$ 1770, 1700, 1670, 1580, 1250 cm.$^{-1}$.

Anal. Calcd. for $C_{26}H_{29}N_5O_8S_2 \cdot H_2O$: C, 50.23; H, 5.03; N, 11.27. Found: C, 50.63; H, 4.69; N, 10.94.

Potassium o-[1-carbomethoxypropen-2-ylaminomethyl]-p-hydroxyphenylacetate

In a 2000 ml. round-bottom flask, fitted with a reflux condenser and an overhead stirrer, is placed 0.28 moles of o-amino-methyl-p-hydroxyphenylacetic acid, 15.28 g. (0.28 moles) of KOH, 64.96 g. (0.56 moles) of methyl acetoacetate and 1500 ml. of absolute methanol. The mixture is then refluxed for 3 hours. The solution is then concentrated to a small volume (100–150 ml.), filtered and diluted with 400–700 ml. of anhydrous ether. Upon scratching, the product crystallizes out. The solid is filtered and dried in a vacuum desiccator over $P_2O_5$. The yield of product, melting at 140–148°, is about 80 g.

Sodium o-(1-ethoxycarbonyl-1-propen-2-ylaminomethyl)-p-hydroxyphenylacetate

To a ethanolic solution of sodium ethoxide prepared from 0.6 g. (0.026 atom) of metallic sodium and 50 ml. of absolute ethanol is added 0.026 mole of o-aminomethyl-p-hydroxyphenylacetic acid and 3.38 g. (0.026 mole) of ethyl acetoacetate and the mixture is refluxed for 6 hours. The mixture is evaporated to dryness and the residue is recrystallized from ethanol to give about 6 g. of sodium o-[1-ethoxycarbonyl-1-propen-2-ylaminomethyl)-p-hydroxyphenylacetate as colorless needles.

t-Butoxycarbonyl azide

To a cooled solution of 100 g. (0.76 mole) of t-butyl carbazate in 87 g. of glacial acetic acid and 120 ml. of water was added dropwise a solution of 60 g. (0.85 mole) of sodium nitrite in 50 ml. of water over a period of 40 minutes, the temperature being kept at 10–15° C. After the addition was completed the stirring was continued for an additional 30 min. at the same temperature. To the mixture was added 100 ml. of water and a separated oil was extracted with five 100 ml. portions of methylene chloride. The combined organic extracts were washed with 100 ml. of 10% sodium bicarbonate solution and 100 ml. of water successively, and dried over anhydrous sodium sulfate. The methylene chloride was removed under diminished pressure on a water bath maintained at 40–45° C. The residual azide was distilled and collected at 45° C./20 mm. Hg. It weighed 92.7 g. (84%).

3-Chloro-6-hydroxypyridazine

A mixture of 22.47 g. (0.15 mole) of 3,6-dichloropyridazine and 50 ml. of acetic acid was refluxed for two hours. The reaction mixture was cooled and diluted with 50 ml. of water and then concentrated to dryness under reduced pressure. The residue was crystallized from water to give 15.8 g. (80%) of 3 - chloro - 6 - hydroxypyridazine as colorless prisms which melted at 133–7° C. (lit. 138–140° C.). See N. Takabayashi, Yakugaku Zasshi, 75, 778 (1955).

3-Hydroxy-6-mercaptopyridazine

A mixture of 2.6 g. (0.02 mole) of 3-chloro-6-hydroxypyridazine and 5.0 g. (0.07 mole) of freshly prepared potassium hydrogen sulfide in 30 ml. of ethanol was heated at 130–140° C. in a sealed tube for 6 hours. The reaction mixture was cooled and diluted with 200 ml. of water. Almost all organic solvent was removed by distillation under reduced pressure. The residual aqueous solution was acidified with dilute hydrochloric acid to pH 3 and extracted with ethyl acetate (6× 50 ml.). The combine extracts were evaporated to dryness and the residue was reprecipitated from 30 ml. of ethanol-ligroin (1:1) to give 2.2 g. (87%) of amorphous 3-hydroxy-6-mercaptopyridazine. M.p. 158–159° C. (lit. 157–158° C.). See J. Druey et al., Helv. Chem. Acta, 37, 121 (1954).

3-Hydroxy-6-mercaptopyridazine

To a solution of 5.6 g. (0.05 mole) of 3,6-dihydroxypyridazine in 150 ml. of pyridine was added portion-wise 2.70 g. (0.012 mole) of phosphorus pentasulfide with vigorous stirring under refluxing. The refluxing was continued for one hour and then the reaction mixture was diluted with 200 ml. of water and concentrated to remove the pyridine. The resulting oily residue was suspended in water and extracted with ethyl acetate. The organic extracts were combined and concentrated again to give oily material which was triturated with a small amount of water to give 3-hydroxy-6-mercaptopyridazine as a yellow solid. Recrystallization from water afforded 0.62 g. (12%) of the product which was identical with that prepared above.

3,6-Dihydroxypyridazine

To a boiling solution of 315 g. (3 moles) of hydrazine dihydrochloride in 2 L of water was added portionwise 295 g. (3 moles) of finely ground maleic anhydride with stirring. After the addition was completed the heating was continued for 4 hours and then allowed to stand overnight in a refrigerator to give 285 g. (85%) of 3,6-dihydroxypyridazine as massive pillars. M.P. >290° C.

3,6-Dichloropyridazine

A mixture of 150 g. (1.33 moles) of 3,6-dihydroxypyridazine and 250 g. of phosphorus oxychloride was refluxed for 3 hours under protection from moisture. The excess of phosphorus oxychloride was removed under reduced pressure and the dark residue was poured into one kg. of crushed ice. The resulting precipitate was collected by filtration. The second crop of the product was obtained from the mother liquor by extraction with five 300 ml. portions of chloroform followed by treating with 1 g. of charcoal and evaporating the solvent. The first and second crops were combined, dissolved in 500 ml. of chloroform and treated again with one g. of charcoal and concentrated to give 165 g. (83%) of 3,6-dichloropyridazine as fine needles melting at 60–61° C. (in a sealed tube).

6-Chloro-3-hydroxypyridazine

A suspension of 60 g. (0.4 mole) of 3,6-dichloropyridazine in 200 ml. of 10% hydrochloric acid was refluxed for 2 hours until a clear solution was obtained. The clear solution was treated with ca. 1.5 g. of active carbon and filtered. The filtrate was concentrated under reduced pressure to give 6-chloro-3-hydroxypyridazine as colorless needles. Yield 49.5 g. (98%). M.P. 137–139° C.

3-Hydroxy-6-mercaptopyridazine

A mixture of 50 g. (0.38 mole) of 6-chloro-3-hydroxypyridazine, 60 g. (0.83 mole) of potassium hydrogen sulfide in 250 ml. of ethanol was heated in a 500 ml. autoclave at 140° C. for 14 hours with magnetic stirring. The pressure reached to 15–20 kg./cm.². The mixture was evaporated to dryness and the residue was dissolved in 300 ml. of water. The aqueous solution was acidified with dil. hydrochloric acid to pH 3 and extracted with ten 200 ml. portions of ethyl acetate. The combined extracts were concentrated to give 34.3 g. (70%) of amorphous 3-hydroxy-6-mercaptopyridazine. M.p. 151–152° C.

7-Amino-3-(6-hydroxypyridazin-3-ylthiomethyl)-3-cephem-4-carboxylic acid

A mixture of 0.60 g. (0.0047 mole) of 3-hydroxy-6-mercaptopyridazine, 1.27 g. (0.0047 mole) of 7-aminocephalosporanic acid, 0.78 g. (0.0094 mole) of sodium bicarbonate in 25 ml. of 0.1 $M$ phosphate buffer (pH 6.4) was heated at 60° C. for 5 hours. The reaction mixture was filtered to remove a trace of insoluble material and the filtrate was adjusted to pH 5 with acetic acid to give brown precipitates, which were collected by filtration, washed with water and acetone successively and dried in vacuo to give 7-amino-3-(6-hydroxypyridazin-3-ylthiomethyl)-3-cephem-4-carboxylic acid: 1.03 g. (71%). M.p. 290–300° C. (decomp.).

IR: $\gamma_{max}^{KBr}$ 1805, 1680, 1650, 1580, 1415 cm.$^{-1}$.

UV: $\lambda_{max}^{1\% NaOH}$ 249 nm ($\epsilon$ 19400).

NMR: $\delta_{p.p.m.}^{D_2O-K_2CO_3}$ 3.22 (1H, d, 19 Hz.), 3.37 (1H, d, 14 Hz.), 3.65 (1H, d, 14 Hz.), 3.72 (1H, d, 19 Hz.), 4.90 (1H, d, 4 Hz.), 5.30 (1H, d, 4 Hz.), 6.75 (1H, d, 10 Hz.), 7.30, (1H, d, 10 Hz.).

Anal. Calcd. for $C_{12}H_{12}N_4O_4S_2 \cdot \frac{1}{2}H_2O$: C, 41.25; H, 3.75; N, 16.04; S, 18.36.
Found: C, 41.45; H, 3.70; N, 15.83; S, 18.03.

7-Amino-3-(3-hydroxypyridazine-6-ylthiomethyl)-3-cephem-4-carboxylic acid

A mixture of 141 g. (0.52 moles) of 7-ACA, 92 g. (1.1 moles) of sodium bicarbonate and 73 g. (0.57 moles) of 3-hydroxy-6-mercaptopyridazine in 1.5 L of 0.1 $M$ phosphate buffer (pH 6.4) was heated at 60–65° C. under nitrogen atmosphere for 4 hours. The hot mixture was treated with 2 g. of charcoal and filtered. The filtrate was cooled to room temperature and adjusted to pH 4.5 with glacial acetic acid to give the precipitate, which was collected by filtration, washed with one L of acetone and air-dried at room temperature to yield 125 g. (70%) of 7-amino-3-(3-hydroxypyridazine-6-ylthiomethyl)-3-cephem-4-carboxylic acid. M.p. 240–250° C. (dec.).

The following examples are given in illustration of, but not in limitation of, the present invention. All temperatures are in degrees Centigrade. 7-Aminocephalosporanic acid is abbreviated as 7-ACA; —ACA— represents the moiety having the structure

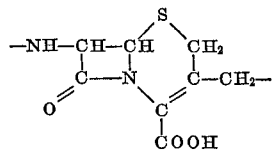

and thus 7-ACA can be represented as

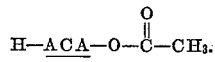

Methyl isobutyl ketone is represented as MIBK. "Skellysolve B" is a petroleum ether fraction of B.P. 60–68° C. consisting essentially of n-hexane.

DESCRIPTION OF THE PREFERRED EMBODIMENTS

Example 1

7-(2 - Aminomethyl-4-hydroxyphenylacetamido)-3-(6-hydroxypyridazin - 3 - ylthiomethyl)-3-cephem-4-carboxylic acid Trifluoroacetic acid (2 ml.) and 7-(2-t-butoxycarbonylaminomethyl-4-hydroxyphenylacetamido)-3-(6 - hydroxypyridazin-3-ylthiomethyl)-3-cephem - 4 - carboxylic acid (850 mg., 1.4 mmoles) were mixed under cooling at 0–5° C. and stirred for one hour. The mixture was diluted with 150 ml. of ether to give the trifluoroacetate of the desired cephalosporin, 7-(2-aminomethyl - 4 - hydroxyphenylacetamido)-3-(6-hydroxypyridazin - 3 - ylthiomethyl)-3-cephem-4-carboxylic acid, which was collected by filtration and suspended in 30 ml. of water. The suspension was adjusted to pH 6 with dil. ammonium hydroxide and diluted with one L of acetonitrile with stirring. The solid was collected, washed with acetonitrile (3 × 100 ml.) and dried in vacuo to give 546 mg. (77%) of the desired 7 - (2-aminomethyl-4-hydroxyphenylacetamido)-3-(6-hydroxypyridazin-3-ylthiomethyl)-3-cephem - 4 - carboxylic acid melting at 210° C. (dec.).

IR: $\nu_{max}^{KBr}$ 1770, 1660, 1580, 1390 cm.$^{-1}$.

Anal. Calcd. for $C_{21}H_{21}N_5O_6S_2 \cdot 3H_2O$: C, 43.82; H, 4.73; N, 12.56.
Found: C, 43.85; H, 4.28; N, 13.12.

Example 2

7-(o - Aminomethyl - p - hydroxyphenylacetamido)-3-(3-hydroxypyrimidin - 6-ylthiomethyl-3-cephem-4-carboxylic acid To a stirred suspension of 2.1 mmoles of sodium o-(1-ethoxycarbonyl - 1 - propen-2-ylaminomethyl)-p-hydroxyphenylacetate in 5 ml. of dried acetonitrile containing one drop of N,N'-dimethylbenzylamine is added 0.25 g. (2.3 mmoles) of ethyl chloroformate with stirring at −15° C., and the stirring is continued for 20 minutes at −10−−15° C. To the mixture is added in one portion a solution of 0.71 g. (2.1 mmoles) of 7-amino-3-(3-hydroxypyridazin-6-ylthiomethyl)-3-cephem-4-carboxylic acid and 0.21 g. (2.1 mmoles) of triethylamine in 3 ml. of acetonitrile and 3 ml. of water, and the mixture is stirred for one hour at 0° C. The reaction mixture is treated with a small amount of charcoal and filtered. To the filtrate is added 0.5 ml. of formic acid with shaking and the mixture is filtered to remove a small amount of unreacted 7-amino-3-(3-hydroxypyridazin - 6 - ylthiomethyl)-3-cephem-4-carboxylic acid. To the filtrate is added 100 ml. of acetonitrile and the mixture is allowed to stand for one hour at room temperature. The precipitate is collected by filtration, washed with 10 ml. of water and dried *in vacuo* to give about 0.5 g. of 7 - (o - aminomethyl-p-hydroxyphenylacetamido)-3-(3-hydroxypyridazin - 6 - ylthiomethyl)-3-cephem-4-carboxylic acid.

Example 3

7 - o - Aminomethyl - p-hydroxyphenylacetamido-3-(3-hydroxy-pyridazin-6-ylthiomethyl)-3-cephem-4-carboxylic acid In a 1 liter three-necked round-bottom flask, fitted with a drying tube, overhead stirrer and thermometer is placed 0.08 mole of well pulverized potassium o-[1-carbomethoxypropen-2-ylaminomethyl]-p-hydroxyphenylacetate in 350 ml. of dry tetrahydrofuran (THF) and 4 drops of N,N-dimethylbenzylamine. The suspension is vigorously stirred and cooled to −40° with an acetone-Dry Ice bath. To the suspension 13.6 g. (0.06 mole) of isobutyl chloroformate is added all at once while maintaining the temperature below −35°. After 2.5 min. the acetone-Dry Ice bath is removed and a solution of 0.036 mole of 7-amino-3-(3-hydroxypyridazin- 6-ylthiomethyl) - 3-cephem-4-carboxylic acid and 5.04 g. (0.050 mole) of N-methylmorpholine in 250 ml. of water is added. The reaction mixture is stirred until it reaches room temperature (1–2 hr.). The THF is removed under reduced pressure. The aqueous solution is layered with 100 ml. of ethyl acetae and acidified to pH 1.7–2.0 with concentrated HCl. The mixture is treated with 3.5 g. of charcoal ("Darco KB") and filtered. The layers are separated and the aqueous phase is extracted with 2× 100 ml. portions of ethyl acetate. The aqueous phase is then filtered through filter paper and the pH adjusted to 4.0. After scratching, the solution is left overnight at 5–7° to crystallize. The product is collected by filtration, washed with a small amount of water and dried in a vacuum desiccator over $P_2O_5$. The yield of 7-(o-aminomethyl - p-hydroxyphenylacetamido)-3-(3-hydroxypyridazin-6-ylthiomethyl)-3-cephem-4-carboxylic acid is about 30%.

Example 4

A suspension of the zwitterionic form of 7-(o-aminomethyl - p-hydroxyphenylacetamido)-3-(3-hydroxy-pyridazin-6-ylthiomethyl)-3-cephem-4-carboxylic acid (0.361 g.) in 3 ml. of methanol is cooled in ice and treated with a few drops of concentrated hydrochloric acid until a clear solution is obtained. 7-(o-Aminomethyl-p-hydroxyphenylacetamido) - 3 - (3-hydroxy-pyridazin-6-ylthiomethyl)-3-cephem-4-carboxylic acid hydrochloride precipitates as a pale brown colored solid upon the addition of ether and is collected by filtration and dried *in vacuo* over $P_2O_5$.

Example 5

To a stirred suspension of the zwitterionic form of 7-(o-aminomethyl - p-hydroxyphenylacetamido)-3-(3-hydroxypyridazin - 6 - ylthiomethyl) - 3-cephem-4-carboxylic acid (0.361 g.) is added 1 N aqueous sodium hydroxide at room temperature until a clear solution (pH 10.8) is obtained. This solution is immediately freeze-dried to give impure, solid sodium 7-(o-aminomethyl-p-hydroxyphenylacetamido) - 3 - (3-hydroxy-pyridazin-6-ylthiomethyl)-3-cephem-4-carboxylate.

PREPARATIONS OF DIMETHANESULFONATE

Example 6

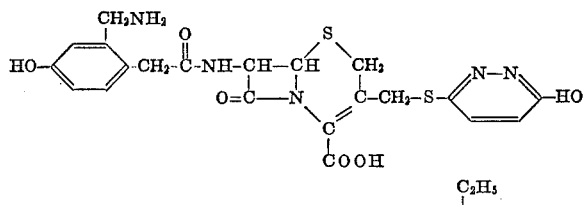

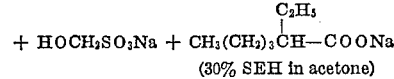

(30% SEH in acetone)

1. Heat in Water
2. Carbon treat and filter
3. Add filtrate to anhydrous alcohol

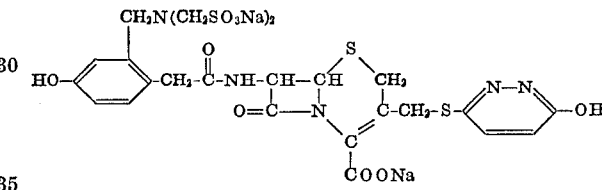

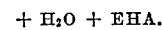

*Procedure*: Put 2.0 moles (about 1010 g. on an anhydrous basis) of 7-(o-aminomethyl-p-hydroxyphenylacetamido - 3-(3-hydroxypyridazin-6-ylthiomethyl)-3-cephem-4-carboxylic acid, 540 g. of sodium formaldehyde bisulfite (4.03 moles), 3000 ml. of water and 2700 ml. (4.87 moles) of 30% SEH (sodium 2-ethylhexanoate) in acetone in a suitable tank and with stirring heat the mixture to 40–45° C. The mixture dissolves in about 10 min. to a yellow solution.

After 15 minutes of heating add 50 g. of decolorizing charcoal ("Darco KB") to the solution and stir 15 minutes more at 40–45° C.

Filter through diatomaceous earth ("Dicalite") after heating the reaction at 40–45° C. for a total of 30 minutes.

Wash the carbon cake with 2000 ml. of 50% ethanol-water.

Combine the filtrates, adjust to 25° C. and add the solution at 25° C. to 112 liters of rapidly stirred 100% ethyl alcohol. A fine white amorphous precipitate of the di-(sodium-methane sulfonate) of sodium 7-(o-aminomethyl - p-hydroxyphenylacetamido-3-(3-hydroxypyridazin-6-ylthiomethyl)-3-cephem-4-carboxylate forms.

Stir the suspension for about 10 minutes and then filter and wash the cake with 15 liters of 100% ethyl alcohol.

Dry the cake at 50–55° C. in an oven with air circulating for about 2 hours and then under vacuum at 4–6 mm. for 24 hours.

The yield is about 1200–1400 g. of amorphous, white, solid di(sodium-methane sulfonate) of sodium 7-(o-aminomethyl - p-hydroxyphenylacetamido-3-(3-hydroxypyridazin - 6 - ylthiomethyl)-3-cephem-4-carboxylate. The product usually contains several percent water and possibly a trace of ethanol.

This product is also named sodium 7-[o-N,N-bis(sodiosulfomethyl)aminomethyl - p-hydroxyphenylacetamido]-3 - (3 - hydroxy - pyridazin-6-ylthiomethyl)-3-cephem-4-carboxylate.

Example 7

The following slurry is prepared:
2.19 grams of sodium-formaldehyde bisulfite (2 equivalents).

3.5 g. of 7-(o-aminomethyl - p - hydroxyphenylacetamido)-3-(3-hydroxypyridazin - 6 - ylthiomethyl) - 3-cephem-4-carboxylic acid zwitterion (100–200 mesh).

25 ml. of water (volume can be varied).

14 ml. of 30% SEH-isopropanol.

A near solution is obtained in about 0.5 hour of rapid stirring at 24° C. The temperature of the mixture is raised rapidly to 40–43° C. This is maintained for about two minutes and then rapidly cooled to 20–23° C.

The solution is filtered to remove some insolubles (total time in solution should not exceed two hours).

The pH 7.3 solution is added over a 5 minute period to 600 ml. of very rapidly stirring absolute ethanol (other alcohols such as anhydrous isopropanol may be used). An amorphous precipitate of the di(sodium-methane sulfonate) of soduim 7-(o-aminomethyl - p - hydroxyphenyl-acetamido-3-(3-hydroxypyridazine - 6 - ylthiomethyl) - 3-cephem-4-carboxylate forms. The mixture is stirred for 5 minutes. The precipitate is collected by filtration, washed with 60 ml. of ethanol (or isopropanol) and vacuum dried at 50° C. for 24 hours. The yield is about 4.3 g.

The product is soluble in water at about pH 7 to the extent of at least 200 mgm./ml. Such a solution is stable for at least two hours at room temperature; more dilute solutions are stable even longer. The product shows the same antibacterial spectrum as the parent zwitterion and is fully biologically active whether it has hydrolyzed back to the zwitterion or not.

Example 8

Sodium 7-[o-N,N-bis(sodiosulfomethyl)aminomethyl - p-hydroxyphenylacetamido] - 3 - (3 - hydroxy-pyridazin-6-ylthiomethyl-3-cephem - 4 - carboxylate. Preparation using hydroxymethanesulfonate A mixture of 2.05 mmole of 7-(o-aminomethyl-p-hydroxyphenylacetamido) - 3-(3-hydroxypyridazin-6-ylthiomethyl)-3-cephem-4-carboxylic acid zwitterion, 1.56 g. (10 mmole) of sodium hydroxymethanesulfonate monohydrate, 6 ml. (6 mmole) of 1 M SEH solution in ethyl acetate, 10 ml. of isopropanol and 10 ml. of water is stirred at room temperature for 3.5 hr. The resulting solution is treated with 1 g. of active carbon and poured under stirring into 300 ml. of abs. ethanol and the mixture is stirred at room temperature for 30 min. to give the crystalline product which is collected by filtration, washed with three 50 ml. portions of abs. ethanol and dried over $P_2O_5$ at 45—52°/1 mm. for 20 hr. to give about 1.5 g. of sodium 7-[o-N,N-bis(sodiosulfomethyl) aminomethyl - p-hydroxyphenylacetamido]-3-(3-hydroxy-pyridazin-6-ylthiomethyl)-3-cephem-4-carboxylate which is readily soluble in water (>1 g./ml.)

Example 9

Sodium 7-[o-N,N-bis(sodiosulfomethyl)aminomethyl - p-hydroxyphenylacetamido]-3-(3-hydroxy - pyridazin - 6-ylthiomethyl-3-cephem - 4 - carboxylate. Preparation using formalin and sodium bisulfite (a) To a solution of 1 ml. (10 mmole) of 30% formalin and 1 g. of sodium bisulfite in 10 ml. of water is added successively 2 mmole of 7-(o-aminomethyl-p-hydroxyphenylacetamido) - 3 - (3 - hydroxypyridazin - 6 - ylthiomethyl)-3-cephem-4-carboxylic acid zwitterion, 6 ml. of 1 M SEH solution and 10 ml. of isopropanol. The mixture is stirred for 2.5 hours at room temperature and poured into 300 ml. of ethanol. The resulting sodium 7-[o-N,N - bis(sodiosulfomethyl)aminomethyl-p-hydroxyphenylacetmadio] - 3 - (3 - hydroxypyridazin-6-ylthiomethyl-3-cephem-4-carboxylate is collected by filtration, washed with three 50 ml. portions of ethanol and dried in vacuo. Yield about 1.5 g.

(b) To a mixture of 2 mmole of 7-(o-aminomethyl-p - hydroxyphenylacetamido)-3-(3-hydroxypyridazin - 6-ylthiomethyl)-3-cephem-4-carboxylic acid zwitterion, 6 ml. of 1 M SEH in ethyl acetate, 10 ml. of isopropanol and 10 ml. of water is added 1 ml. (10 mmole) of 30% formalin. The mixture is stirred for 2 hours at room temperature to give a clear solution with a small amount of oily precipitate. After 1 g. of sodium bisulfite is added, the solution is stirred for an additional 2 hours, during which time the oily precipitate dissolves in the solution. The reaction mixture is poured into 300 ml. of ethanol under vigorous stirring to give about 1.8 g. of sodium 7-[o-N,N - bis(sodiosulfomethyl)aminomethyl - p - hydroxyphenylacetamido]-3-(3-hydroxy - pyridazin-6-ylthiomethyl)-3-cephem-4-carboxylate, which is collected by filtration, washed with three 50 ml. portions of ethanol and dried in vacuo.

In vitro and In vivo Studies

7 - (o - Aminomethyl - p-hydroxyphenylacetamido)-3-(3 - hydroxypyridazin - 6-ylthiomethyl)-3-cephem-4-carboxylic acid, is a new broad-spectrum semi-synthetic cephalosporin having the structure shown below.

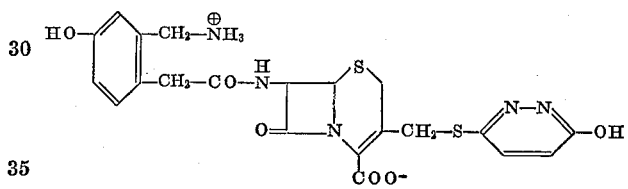

It has been shown to possess excellent in vitro and in vivo activities against a wide variety of Gram-positive and Gram-negative bacteria including those which are resistant to cephalothin and cephaloridine. Its dimethanesulfonate adduct having the structure

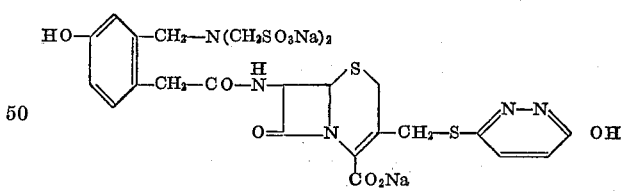

is prepared as a water-soluble preparation useful for injection and for studies of absorption and excretion, acute toxicity and pain liability upon injection.

Initial studies of in vitro antibacterial activity by the tube dilution method of agar dilution method of this new cephalosporin showed Minimum Inhibitory Concentrations (M.I.C.'s) of less than 1.0 mcg./ml. for all or nearly all strains tested of Staphylococcus aureus, Streptococcus pyogenes, Diplococcus pneumoniae, Bacillus anthracis, Proteus rettgeri, Shigella, Salmonella enteritidis and Salmonella typhosa and M.I.C.'s usually less than 4 mcg./ml. and in some cases less than 1.0 mcg./ml. against various strains of Escherichia coli, Klebsiella pneumoniae, Proteus vulgaris and Proteus mirabilis.

The in vivo efficacy of this compound by subcutaneous injection was studied in mice having experimental infections caused by two pathogenic bacteria comprising a penicillinase-positive S. aureus and a cephalosporinase-positive E. coli. In each case the median curative dose ($CD_{50}$) was less than 10 mgm./kg.

We claim:
1. The compound of the formula

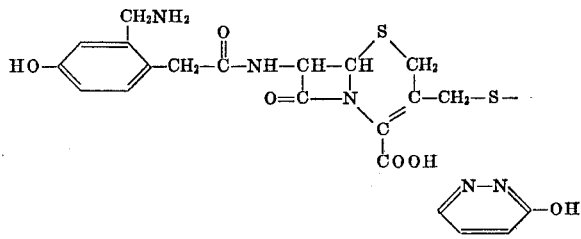

2. The sodium salt of the compound of claim 1.
3. The potassium salt of the compound of claim 1.
4. The hydrochloride of the compound of claim 1.
5. The zwitterion form of the compound of claim 1.
6. A nontoxic, pharmaceutically acceptable acid addition salt of the compound of claim 1.

7. The compound of the formula

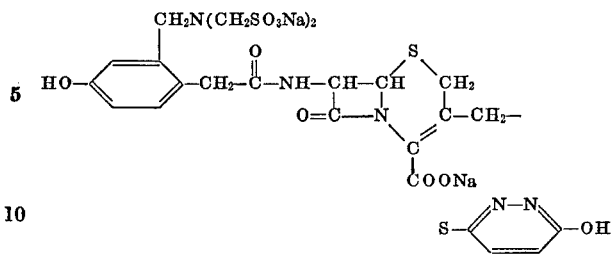

References Cited
UNITED STATES PATENTS
3,641,021   2/1972   Ryan _____ 260—243 C NICHOLAS S. RIZZO, Primary Examiner U.S. Cl. X.R.

424—246